United States Patent
Kopchick

(10) Patent No.: US 8,863,647 B2
(45) Date of Patent: Oct. 21, 2014

(54) OIL GALLERY PISTON WITH IMPROVED THERMAL CONDUCTIVITY

(75) Inventor: Joseph C. Kopchick, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 802 days.

(21) Appl. No.: 13/100,405

(22) Filed: May 4, 2011

(65) Prior Publication Data

US 2012/0279389 A1 Nov. 8, 2012

(51) Int. Cl.
| | |
|---|---|
| *F02F 3/10* | (2006.01) |
| *B23P 15/10* | (2006.01) |
| *C25D 7/10* | (2006.01) |
| *C25D 3/38* | (2006.01) |
| *C23C 18/40* | (2006.01) |
| *C23C 18/54* | (2006.01) |

(52) U.S. Cl.
CPC . *B23P 15/10* (2013.01); *C25D 7/10* (2013.01); *F02F 7/10* (2013.01); *C25D 3/38* (2013.01); *C23C 18/405* (2013.01); *C23C 18/54* (2013.01)
USPC ....................................... 92/186; 29/888.045

(58) Field of Classification Search
USPC .................. 92/186, 223; 29/888.04, 888.042, 29/888.045
See application file for complete search history.

(56) References Cited

U.S. PATENT DOCUMENTS

| | | | | |
|---|---|---|---|---|
| 4,368,697 A | * | 1/1983 | Moebus | 92/186 |
| 7,281,466 B1 | * | 10/2007 | Wilksch et al. | 92/186 |
| 2009/0025550 A1 | * | 1/2009 | Benz et al. | 92/186 |
| 2010/0147250 A1 | * | 6/2010 | Boczek et al. | 92/186 |
| 2011/0120299 A1 | * | 5/2011 | Aro | 92/186 |

FOREIGN PATENT DOCUMENTS

| | | |
|---|---|---|
| CN | 1031594 A | 3/1989 |
| JP | H08232758 A | 9/1996 |

OTHER PUBLICATIONS

Kuznetsov, et al., Electrochemical Study of the Electroless Copper Plating Process, Surface and Coatings Technology, 28, 1986, pp. 151-160, The Netherlands.

Golovtshanskaya, et al., Metal Microdistribution in Electroless Copper Plating, Surface and Coatings Technology, 29, 1986, pp. 73-76, The Netherlands.

Vaskelis, et al., The Surface Layer pH in the Electroless Copper Plating Process, Surface and Coatings Technology, 31, 1987, pp. 45-54, The Netherlands.

Kanungo, et al., Study on Morphology of Copper Deposited Onto Aluminium by Immersion Plating From an Oxalate Bath Containing Perchloric Acid, Minerals Engineering 16, 2003, pp. 1383-1386, USA.

Kanungo, et al., Influence of Perchloric Acid on the Kinetics of Immersion Plating of Copper Onto Aluminium, Hydrometallurgy, 61, 2001, pp. 1-11, USA.

* cited by examiner

*Primary Examiner* — Thomas E Lazo
(74) *Attorney, Agent, or Firm* — Dinsmore & Shohl LLP

(57) ABSTRACT

A method of making a piston with enhanced thermal conductivity. In one embodiment, the method includes providing a piston with an oil gallery, the piston made of a material; and depositing a layer of a material in the oil gallery, the material having a higher thermal conductivity than a thermal conductivity of the piston material. Another aspect of the invention is a piston having enhanced thermal conductivity.

21 Claims, 1 Drawing Sheet

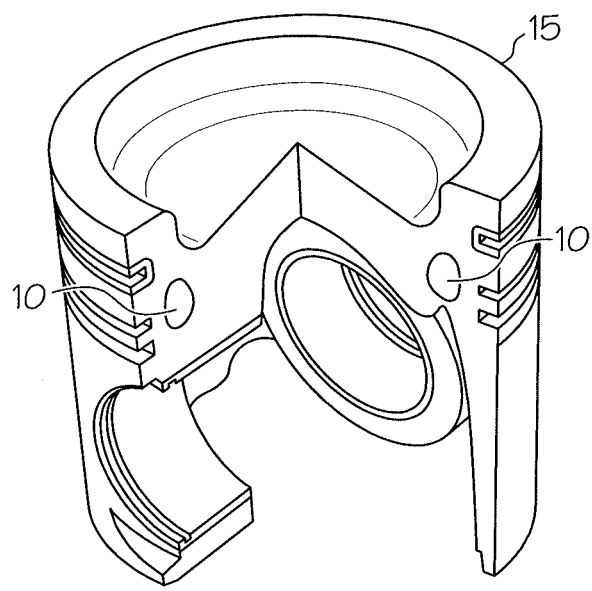

OIL GALLERY PISTON WITH IMPROVED THERMAL CONDUCTIVITY

BACKGROUND TO THE INVENTION

The invention relates to pistons and more particularly, oil gallery passages in the piston having improved thermal conductivity.

The current trend in the automobile industry is towards increasing the power density of the engine, reducing emissions, and making lighter engines. These requirements lead to a higher thermal load on the engine, especially on the pistons. As a result, the engine, and especially the pistons, experience high temperature. Control of piston temperatures has become one of the determining factors in a successful engine design. Excessive piston temperatures will lead to increased friction at piston-to-bore, piston-to-ring, and piston-to-piston pin interfaces and may result in engine seizure.

Pistons may be cooled by oil jets fired at the underside of the piston's dome. Higher output engines (e.g., turbocharged gas and diesel) typically have an oil gallery designed into the piston dome so that engine oil can be injected into the gallery to facilitate cooling. FIG. 1 shows an example of oil gallery hole 10 cast in a piston 15. Heat reaching the oil gallery during engine operation is conducted away by the oil flowing through it. Approximately 80% of the heat of combustion is removed from high output pistons by means of oil gallery cooling.

SUMMARY OF THE INVENTION

One aspect of the invention is a method of making a piston with enhanced thermal conductivity. In one embodiment, the method includes providing a piston with an oil gallery, the piston made of a material; and depositing a layer of a material in the oil gallery, the material having a higher thermal conductivity than the thermal conductivity of the piston material.

Another aspect of the invention is a piston having enhanced thermal conductivity. In one embodiment, the piston is made of a material, the piston including an oil gallery coated with a layer of material having a higher thermal conductivity than a thermal conductivity of the piston material.

BRIEF DESCRIPTION OF THE INVENTION

FIG. 1 is an illustration of a piston having an oil gallery passage.

DETAILED DESCRIPTION OF THE INVENTION

Current oil gallery designs rely on heat being removed as it is conducted from the dome. The present invention facilitates the removal of heat because there is a layer of a material more thermally conductive than the piston material inside the oil gallery, which more quickly distributes the heat around the surface area which is exposed to the oil.

A thin layer of a material having a higher thermal conductivity than the piston material is deposited on the oil gallery wall of the pistons for gasoline and/or diesel engines. The layer of material having the higher thermal conductivity is preferably continuous, but this is not required. The layer of material having the higher conductivity is typically several microns thick or more.

The presence of a coating having a higher thermal conductivity than the piston material on the inside of the gallery wall will distribute the heat quickly 360 degrees around the gallery, increasing the effective path by which heat is conducted to the oil. This provides more effective cooling of the piston dome and the top ring groove, which will improve the durability of those regions.

The coating having the higher thermal conductivity is typically copper, although another material having a higher conductivity than the piston material could also be used.

The coating having the higher thermal conductivity can be deposited on the oil gallery wall by electroless plating, either autocatalytic or immersion. Alternatively, an electroplating process can be used.

In one embodiment, the material having the higher thermal conductivity can be plated onto aluminum or steel by first degreasing and cleaning the surface to be plated using trichloroethylene, methylene chloride, or other solvents. For aluminum pistons a solution containing copper sulfate, perchloric acid, and ammonium oxalate is degassed with nitrogen or ultrasonic energy, and poured into the piston such that it is in contact with the surfaces to be plated. Plating kinetics with this type of solution are described in "Influence of perchloric acid on the kinetics of immersion plating of copper onto aluminum," Hydrometallurgy, 61 (2001) 1-11, Mandakini et al.; and "Study of morphology of copper deposited onto aluminium by immersion plating from an oxalate bath containing perchloric acid," Minerals Engineering, 16 (2003) 1383-1386, Kanungo et al., which are incorporated herein by reference. Other methods which incorporate various solutions and chelating agents such as ethylenediaminetetraacetic acid or triethanolamine will optimize the plating process by increasing the copper plating rate. Typical embodiments are described in "Effect of chelating agents on the structure of electroless copper coating on alumina powder," Surface and Coatings Tech., 107 (1998) 48-54, Lin et al., which is incorporated herein by reference. For steel components, the actual plating solutions will vary and may include copper sulfate and sulfuric acid along with other additives.

Alternatively, an autocatalytic process can be used. A solution of copper sulfate, ethylenediaminetetraacetic acid or tartrate, sodium carbonate, and formaldehyde can be used. This plating process is described in Kuznetsov et al., "Electrochemical Study of the Electroless Copper Plating Process," Surface and Coatings Tech., 28 (1986) 151-160, Golovtshanskaya et al., "Metal Microdistribution in Electroless Copper Plating," Surface and Coatings Tech., 29 (1986) 73-76, and Vaskelis et al., "The Surface Layer pH in the Electroless Copper Plating Process," Surface and Coatings Tech., 31 (1987) 45-54, which are incorporated herein by reference.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a piston with enhanced thermal conductivity comprising:
    providing a piston having an oil gallery, the piston made of a first material; and
    depositing a layer of a second material in the oil gallery to form a continuous layer over the entire oil gallery, the second material having a higher thermal conductivity than a thermal conductivity of the first material.

2. The method of claim 1 wherein depositing the layer of the second material in the oil gallery comprises electroless plating, or electroplating.

3. The method of claim 1 wherein depositing the layer of the second material in the oil gallery comprises electroless plating, and wherein the electroless plating is autocatalytic electroless plating or immersion electroless plating.

4. The method of claim 1 wherein depositing the layer of the second material in the oil gallery comprises:
    providing a solution comprising copper sulfate; and
    introducing the solution to the oil gallery.

5. The method of claim 4 wherein the solution further comprises perchloric acid, and ammonium oxalate.

6. The method of claim 4 further comprising degassing the solution before introducing the solution into the oil gallery.

7. The method of claim 4 further comprising flushing the oil gallery with an alkaline cleaner or a degreasing solvent before introducing the solution to the oil gallery.

8. The method of claim 1 wherein the second material is copper.

9. The method of claim 1 wherein the first material is aluminum or steel.

10. The method of claim 1 wherein the layer of the second material has a thickness of at least about 3 microns.

11. A method of making a piston with enhanced thermal conductivity comprising:
    providing an aluminum or steel piston having an oil gallery; and
    depositing a layer of copper in the oil gallery by electroless plating to form a continuous layer over the entire oil gallery.

12. The method of claim 11 wherein the electroless plating is autocatalytic electroless plating or immersion electroless plating.

13. The method of claim 11 wherein depositing the layer of copper in the oil gallery comprises:
    providing a solution comprising copper sulfate; and
    introducing the solution to the oil gallery.

14. The method of claim 13 wherein the solution further comprises perchloric acid, and ammonium oxalate.

15. The method of claim 13 further comprising degassing the solution before introducing the solution into the oil gallery.

16. The method of claim 13 further comprising flushing the oil gallery with an alkaline cleaner or a degreasing solvent before introducing the solution to the oil gallery.

17. The method of claim 11 wherein the layer of copper has a thickness of at least about 3 microns.

18. A piston having enhanced thermal conductivity, the piston made of a first material, the piston including an oil gallery coated with a continuous layer of a second material over the entire oil gallery, the second material having a higher thermal conductivity than a thermal conductivity of the first material.

19. The piston of claim 18 wherein the first material is aluminum or steel.

20. The piston of claim 18 wherein the second material is copper.

21. The piston of claim 18 wherein the layer of the second material has a thickness of at least about 3 microns.

* * * * *